US012684244B2

(12) United States Patent
Pillans et al.

(10) Patent No.: US 12,684,244 B2
(45) Date of Patent: Jul. 14, 2026

(54) HEAD-MOUNTED DEVICE WITH SPATIALLY AWARE CAMERA ADJUSTMENTS

(71) Applicant: Apple Inc., Cupertino, CA (US)

(72) Inventors: Luke A Pillans, San Diego, CA (US); Simon Fortin-Deschenes, San Jose, CA (US); Christian I Moore, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 18/455,476

(22) Filed: Aug. 24, 2023

(65) Prior Publication Data

US 2024/0089605 A1    Mar. 14, 2024

Related U.S. Application Data

(60) Provisional application No. 63/406,585, filed on Sep. 14, 2022.

(51) Int. Cl.
*H04N 23/72* (2023.01)
*G06F 3/01* (2006.01)
(Continued)

(52) U.S. Cl.
CPC ............. *H04N 23/72* (2023.01); *G06F 3/012* (2013.01); *H04N 23/13* (2023.01); *H04N 23/73* (2023.01);
(Continued)

(58) Field of Classification Search
CPC .. H04N 23/45; H04N 23/70–73; H04N 23/74; H04N 23/745; H04N 23/75;
(Continued)

(56) References Cited

U.S. PATENT DOCUMENTS 9,420,166 B2 * 8/2016 Hamalainen ........... H04N 23/62
10,477,157 B1 * 11/2019 Shahdi ................. H04N 13/271
(Continued)

FOREIGN PATENT DOCUMENTS

WO    WO-2021104648 A1 *  6/2021    ......... H04N 5/23229
WO       2022060547 A1    3/2022

*Primary Examiner* — Anthony J Daniels
(74) *Attorney, Agent, or Firm* — Treyz Law Group, P.C.; Jason Tsai; Jinie M. Guihan

(57)    ABSTRACT

A head-mounted device may include one or more sensors for capturing images of a real-world environment and for determining where the head-mounted device is facing in the real-world environment. The sensors can be used to capture images for creating a lighting map that indicates where one or more light sources are located within the environment and for creating a physical map representing a geometry of the environment. The sensors can be used to predict a direction in which the head-mounted device will be facing in the real-world environment. One of the sensors can include an image sensor for capturing images that are displayed to a user of the head-mounted device. One or more settings of the image sensor can be adjusted based on the lighting map and based on the predicted direction of where the head-mounted device will be facing when capturing a future frame.

19 Claims, 7 Drawing Sheets

(51) Int. Cl.

| | |
|---|---|
| *H04N 23/13* | (2023.01) |
| *H04N 23/73* | (2023.01) |
| *H04N 23/745* | (2023.01) |
| *H04N 23/76* | (2023.01) |
| *H04N 23/88* | (2023.01) |

(52) U.S. Cl.
CPC ........... *H04N 23/745* (2023.01); *H04N 23/76* (2023.01); *H04N 23/88* (2023.01)

(58) Field of Classification Search
CPC .. H04N 23/88; G06F 3/012; G02B 202/0138; G02B 202/014
See application file for complete search history.

(56) References Cited

U.S. PATENT DOCUMENTS

| | | | |
|---|---|---|---|
| 2010/0299630 A1 | 11/2010 | McCutchen et al. | |
| 2015/0163392 A1* | 6/2015 | Malone ................ | H04N 23/745 348/228.1 |
| 2017/0229059 A1 | 8/2017 | Bonnier et al. | |
| 2018/0054559 A1* | 2/2018 | Welker ................. | H04N 23/661 |
| 2018/0211440 A1* | 7/2018 | Kunkel .................... | G09G 3/00 |
| 2019/0110039 A1* | 4/2019 | Linde ................... | H04N 13/398 |
| 2021/0112189 A1* | 4/2021 | Sun ........................ | H04N 23/71 |
| 2023/0199328 A1* | 6/2023 | Cho ........................ | H04N 25/00 348/241 |
| 2023/0260228 A1* | 8/2023 | Jia .......................... | G09G 5/377 345/633 |

\* cited by examiner

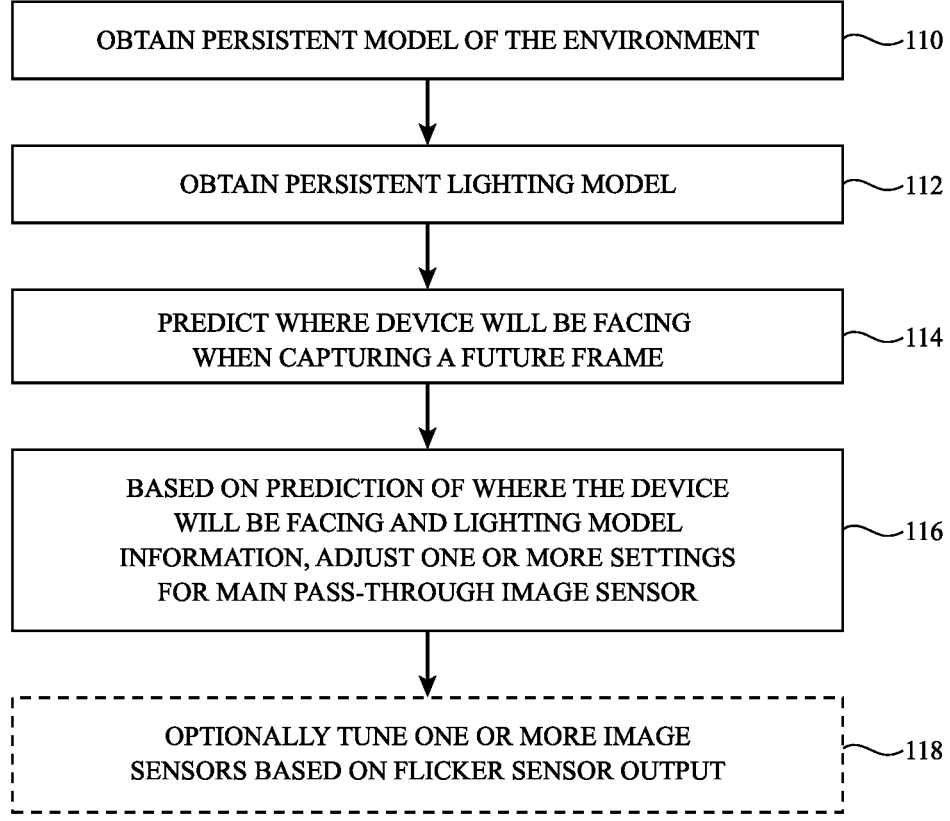

OBTAIN PERSISTENT MODEL OF THE ENVIRONMENT ~110

OBTAIN PERSISTENT LIGHTING MODEL ~112

PREDICT WHERE DEVICE WILL BE FACING
WHEN CAPTURING A FUTURE FRAME ~114

BASED ON PREDICTION OF WHERE THE DEVICE
WILL BE FACING AND LIGHTING MODEL
INFORMATION, ADJUST ONE OR MORE SETTINGS
FOR MAIN PASS-THROUGH IMAGE SENSOR ~116

OPTIONALLY TUNE ONE OR MORE IMAGE
SENSORS BASED ON FLICKER SENSOR OUTPUT ~118

*FIG. 6*

HEAD-MOUNTED DEVICE WITH SPATIALLY AWARE CAMERA ADJUSTMENTS

This application claims the benefit of U.S. Provisional Patent Application No. 63/406,585, filed Sep. 14, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have sensors. For example, a head-mounted device may have a camera for capturing images of the environment surrounding the head-mounted device. The camera can operate in an automatic exposure mode that automatically adjusts the exposure settings of the camera depending on the current light levels in the captured images.

The head-mounted device can be mounted on a user's head. The lighting level of the images can change quickly as the user turns his/her head. Consider a scenario in which the user is initially facing a dimly lit desk and then turns to face a bright sunlit window. Upon detecting the much brighter illumination level of the sunlit window, the camera can automatically adjust the exposure settings of the camera to compensate for the change in brightness. There can, however, be some time lag between when the user turns his/her head and when the camera exposure adjustments take place. Such time lag and also flicker can result in visual discomfort for the user. It is within such context that the embodiments herein arise.

SUMMARY

A head-mounted device may be worn on a user's head. The head-mounted device may be operated in a real-world environment containing lighting from one or more light sources. The head-mounted device may include one or more sensors for capturing images from the real-world environment, for tracking external objects and/or the motion and orientation of the head-mounted device within the real-world environment, and for modeling lighting information and physical geometry information of the real-world (3-dimensional) environment.

An aspect of the disclosure provides a method of operating a head-mounted device in a real-world environment, the method including processing images to create a lighting map indicating where one or more light sources are located within the real-world environment, predicting a direction in which the head-mounted device will be facing in the real-world environment, and adjusting one or more settings of an image sensor based on the lighting map and the predicted direction of the head-mounted device in the real-world environment. The method can optionally further include compiling historical lighting information gathered as the head-mounted device faces different portions of the real-world environment, using one or more motion sensors to determine head pose information associated with the head-mounted device, and adjusting an exposure, white balance, or tone curve of the image sensor based on the lighting map and the predicted direction of the head-mounted device in the real-world environment. The method can also include processing images to create a physical map indicating a geometry of the real-world environment and merging the physical map with the lighting map. The method can further include obtaining an ambient light sensor measurement and using the ambient light sensor measurement to create the lighting map; and obtaining a flicker sensor measurement and adjusting an exposure time of the image sensor based on the flicker sensor measurements.

An aspect of the disclosure provides a head-mounted device operable in a real-world environment containing lighting from one or more light sources. The head-mounted device can include one or more sensors configured to capture images of the lighting within real-world environment and configured to determine a direction in which at least one of the sensors is pointing within the real-world environment and control circuitry configured to process the captured images to create a lighting map indicating where the light sources are located within the real-world environment, and to adjust settings for the at least one of the sensors based on the lighting map and the determined direction in which the at least one of the sensors is pointing within the real-world environment. The one or more sensors can include a first image sensor having a first field of view and configured to capture images that are displayed to one or more eye boxes and a second image sensor having a second field of view wider than the first field of view. The first image sensor can be a color image sensor, whereas the second image sensor can be a monochrome image sensor. The one or more sensors can include an inertial measurement unit configured to output motion data that is used to predict a direction in which the at least one of the sensors will be pointing within the real-world environment. The head-mounted device can optionally further include an ambient light sensor configured to output an ambient light sensor measurement and a flicker sensor configured to output a flicker sensor measurement, where the lighting map is created based on the ambient light sensor measurement and the flicker sensor measurement.

An aspect of the disclosure provides a method of operating a head-mounted device in a real-world environment, including capturing first images of the real-world environment with a first image sensor having a first field of view, presenting the first images captured by the first image sensor to an eye box with a display, capturing second images of the real-world environment with a second image sensor having a second field of view wider than the first field of view, and adjusting the first images captured by the first image sensor based on the second images captured by the second image sensor. The method can further include predicting where the first image sensor will be pointing and adjusting the first images based on the second images captured by the second image sensor and based on the prediction of where the first image sensor will be pointing.

BRIEF DESCRIPTION OF THE DRAWINGS

FIG. 6 is a flow chart of illustrative steps for operating an electronic device of the type shown in FIG. 5 in accordance with some embodiments.

DETAILED DESCRIPTION

Figure 1:
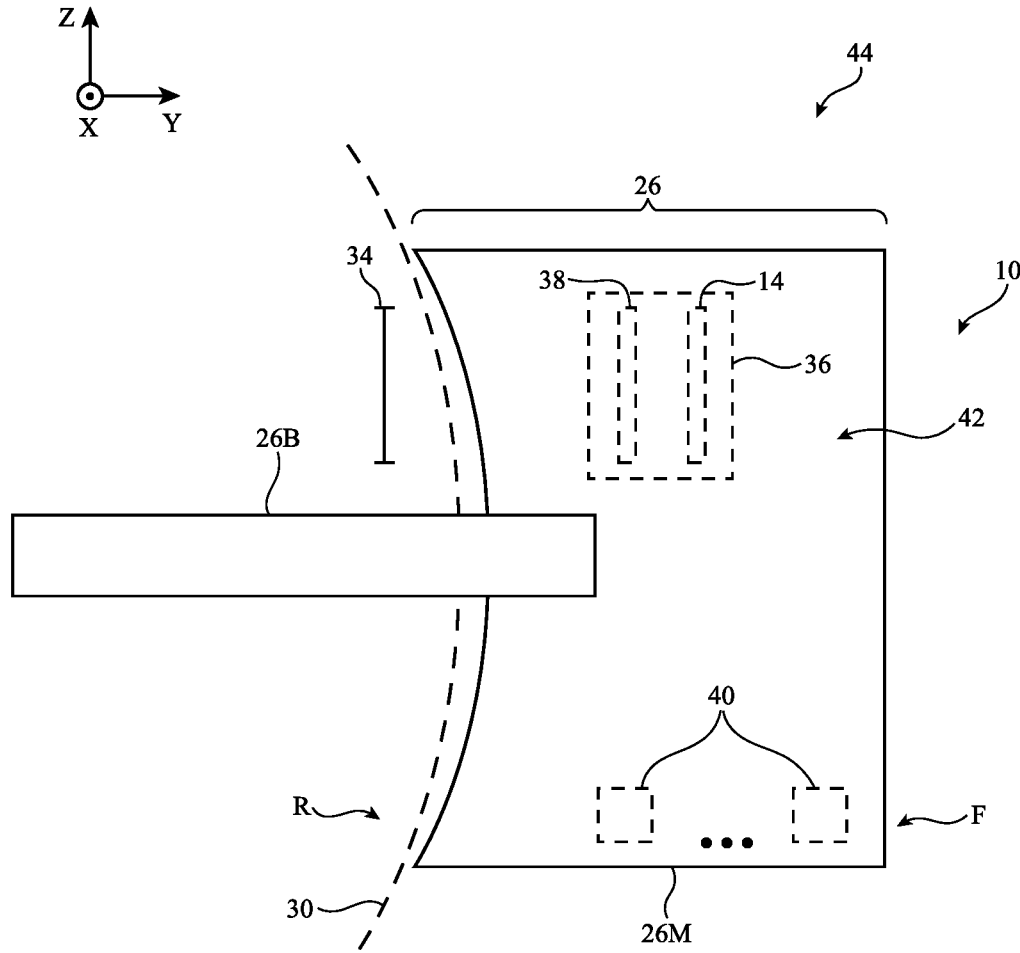
FIG. 1 is a side view of an illustrative electronic device such as a head-mounted device in accordance with some embodiments.

Head-mounted devices include head-mounted support structures that allow the devices to be worn on the heads of users. Displays may be used for presenting a user with visual content. Cameras may be used to capture visible light and infrared images. Cameras may be used, for example, to provide a user with real-time pass-through video, to track hand gestures and other body movements, and to track movement of the head-mounted device relative to the environment surrounding the head-mounted device. The camera providing the real-time pass-through video to the user is sometimes referred to as the main camera or the pass-through camera. The cameras used for tracking movement of body parts or the movement of the head-mounted device relative to the environment can be referred to as secondary (supplement) cameras or tracking cameras.

A head-mounted device may be operated in a real-world environment on a user's head. The real-world environment can have areas with different illumination characteristics. For example, when the head-mounted device is facing a first area of the environment that is dimly lit by an incandescent lamp, the pass-through camera can be operated using first camera settings suitable for the first area with the first lighting characteristics. When the head-mounted device is facing a second area of the environment that is brightly lit by daylight, the pass-through camera can be operated using second camera settings suitable for the second area with the second lighting characteristics.

Images captured using the main camera and/or other supplemental cameras can be used to construct a spatial (3-dimensional) map of the illumination characteristics of the real-world environment. This spatial map can be gathered over time using one or more cameras within the head-mounted device as the user looks around a 3-dimensional environment (e.g., to build a persistent lighting model of the environment based on historical data).

The secondary (tracking) cameras and any 6 DoF (degrees of freedom) tracking systems (e.g., tracking systems that can be used to monitor both rotational movement such as roll, pitch, and yaw and positional movement in the X, Y and Z axis in a 3D environment) can be used to determine the user's current head pose and therefore where the main camera is currently pointing or will be pointing. These positional tracking systems can include inertial measurement units, simultaneous localization and mapping (SLAM) units, time-of-flight measurement units, stereo camera, and other motion sensors. To ensure minimal delay (lag) between adjustment from the first camera settings to the second camera settings, information about where the camera is pointing within the 3D environment and information about the illumination levels and lighting characteristics in the environment can be used to obtain control signals for adjusting an exposure setting for the main camera, a color balance setting for the main camera, a tone curve mapping setting for the main camera, and/or other adjustments to the main camera. The information about the illumination levels and lighting characteristics in the environment can be gathered over time (e.g., to build a lighting model based on historical data) or can be determined in real time using the secondary cameras, one or more ambient light sensors, flicker sensor, and/or other optical sensors, which can have wider field(s) of view than the main pass-through camera and can therefore be used to detect lighting characteristics outside the field of view of the main pass-through camera. Proactively adjusting the camera settings in this way can help minimize delay in the camera settings adjustments and also reduce flicker when the user looks at different areas of the environment with different lighting characteristics and can thus help reduce visual discomfort for the user.

FIG. 1 is a side view of an illustrative head-mounted electronic device of the type that may be provided with circuitry for modeling (mapping) lighting characteristics of an environment and adjusting one or more camera settings based on the mapped lighting information. As shown in FIG. 1, head-mounted device 10 may include head-mounted support structure 26. Support structure 26 may have walls or other structures that separate an interior region of device 10 such as interior region 42 from an exterior region surrounding device 10 such as exterior region 44. Electrical components 40 (e.g., integrated circuits, sensors, control circuitry, light-emitting diodes, lasers, and other light-emitting devices, other control circuits and input-output devices, etc.) may be mounted on printed circuits and/or other structures within device 10 (e.g., in interior region 42).

To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display 14 for presenting an image through a left lens to a user's left eye in a left eye box and a right display 14 for presenting an image to a user's right eye in a right eye box. The user's eyes are located in eye boxes 34 at rear side R of device 10 when structure 26 rests against the outer surface (face surface 30) of the user's face.

Support structure 26 may include a main support structure such as main housing portion 26M (sometimes referred to as a main portion). Main housing portion 26M may form front side F of device 10. On rear side R, main housing portion 26M may have cushioned structures to enhance user comfort as portion 26M rests against face surface 30. If desired, support structure 26 may include optional head straps such as strap 26B and/or other structures that allow device 10 to be worn on a head of a user.

Figure 2:
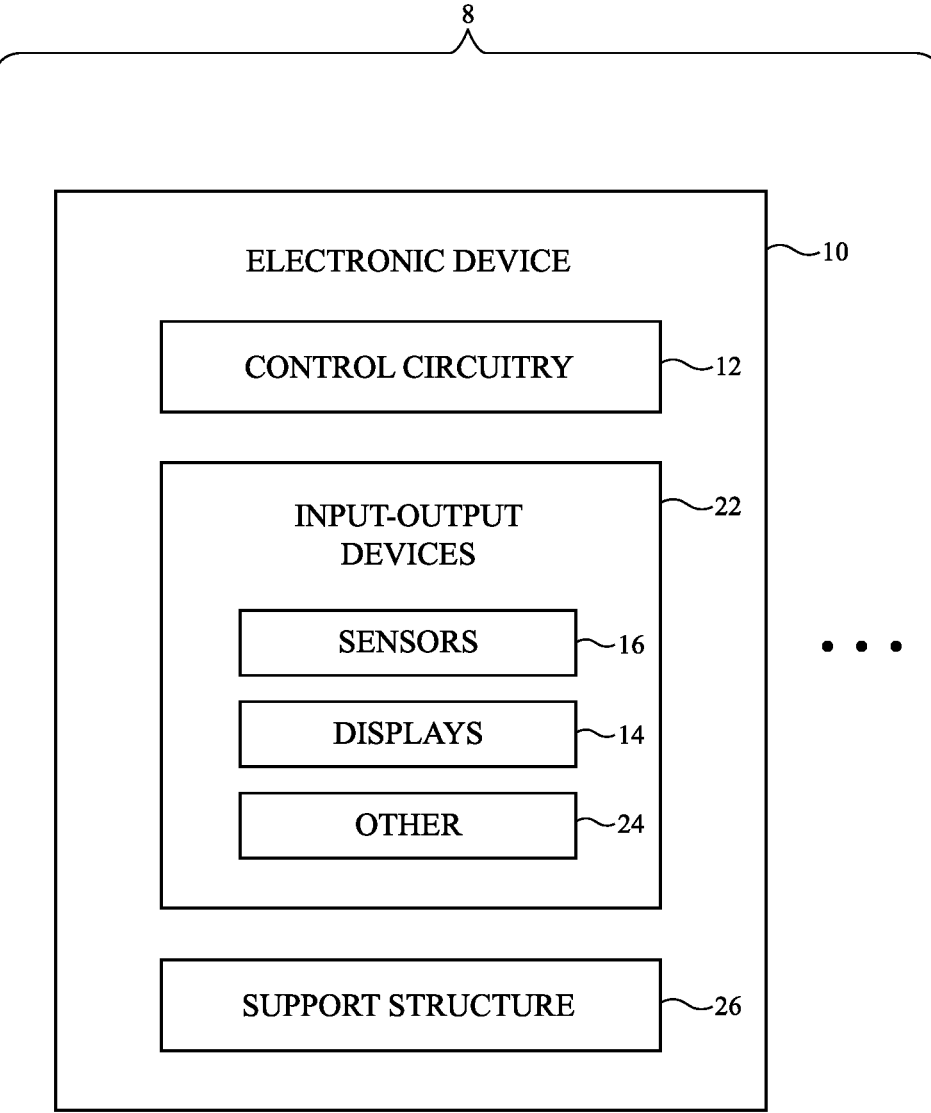
FIG. 2 is schematic diagram of an illustrative system with an electronic device in accordance with some embodiments.

A schematic diagram of an illustrative system that may include a head-mounted device is shown in FIG. 2. As shown in FIG. 2, system 8 may have one or more electronic devices 10. Devices 10 may include a head-mounted device (e.g., device 10 of FIG. 1), accessories such as headphones and wrist watches, computing equipment (e.g., a cellular telephone, tablet computer, laptop computer, desktop computer, and/or remote computing equipment that supplies content to a head-mounted device), and/or other devices that communicate with each other.

Each electronic device 10 may have control circuitry 12. Control circuitry 12 may include storage and processing circuitry for controlling the operation of device 10. Control circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Each device 10 in system 8 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting displays with polymer or semiconductor substrates or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors. The location of each sensor within device 10 relative to display(s) 14 is known.

User input and other information may be gathered using sensors and other input devices in input-output devices 22. If desired, input-output devices 22 may include other devices 24 such as haptic output devices (e.g., vibrating components), light-emitting diodes, lasers, and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12 (see, e.g., components 40 and optical module 36 of FIG. 1).

Figure 3:
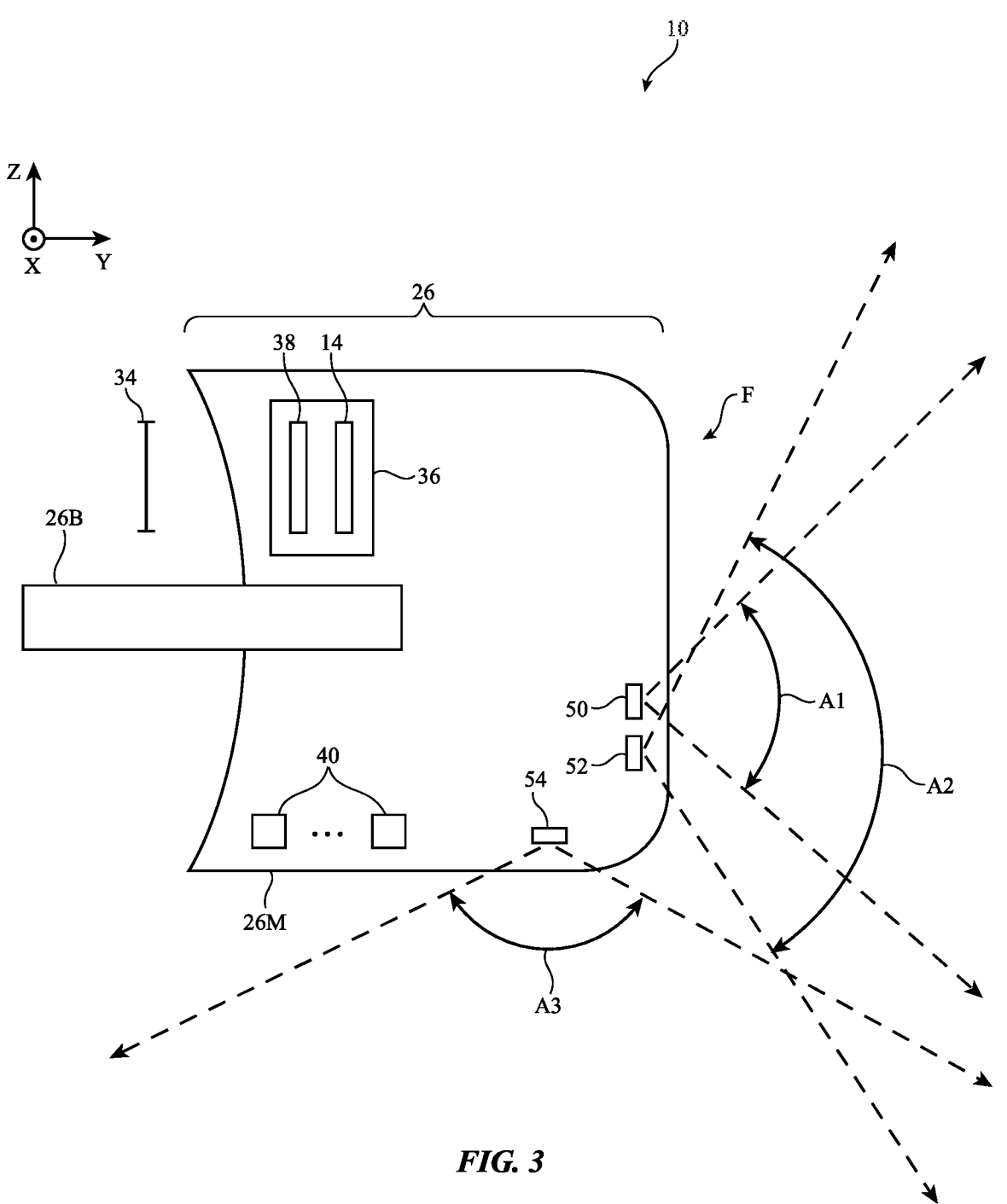
FIG. 3 is side view of an illustrative electronic device with multiple cameras having different fields of view in accordance with some embodiments.

FIG. 3 is a cross-sectional side view of a head-mounted device 10 in an illustrative configuration in which the device includes different types of sensors for monitoring the environment surrounding device 10. Head-mounted device 10 of FIG. 3 may have optical sensors. These sensors may include cameras. The cameras of device 10 may have lenses and image sensors that are configured to capture images at ultraviolet light wavelengths, visible light wavelengths, and/or infrared wavelengths.

As shown in FIG. 3, the right-hand side of device 10 may contain a first camera such as camera 50 that is used for capturing images of a user's environment that are displayed on displays 14 in real time (e.g., real-time pass-through video). The left-hand side of device 10 may have a corresponding camera 50 that is oriented in the same way. The angles of view of cameras 50 on the left and right sides may be configured to overlap in front of device 10, so that there are no gaps in coverage in front of the user. If desired, cameras 50 on the left and right sides of device 10 may be replaced by a single camera or any number of cameras. Camera(s) 50 that are used in capturing real-time video that is displayed as pass-through video to the user are sometimes referred to as scene cameras or pass-through cameras. The pass-through video that is acquired using camera(s) 50 and presented to the user is sometimes referred to as a pass-through video feed or pass-through feed.

Device 10 may also include other cameras that can be used in tracking the positions and movements of external objects. As an example, tracking cameras may track a user's hand or the user's torso or other body part. Hand gesture input may, as an example, be used in controlling operation of device 10. Body part monitoring may be used to allow a user's body motions to be replicated by content displayed in a virtual environment. If desired, device 10 may also include cameras that are used in tracking the position of external accessories (e.g., the position and movement of controllers that are moved by a user to control device 10). In some scenario, visual inertial odometry (VIO) systems or other systems that determine the position, movement, and/or orientation of device 10 relative to the environment surrounded by device 10 may be formed by combining data from one or more cameras in device 10 with additional sensor data (e.g., data from an inertial measurement unit). Cameras may perform dedicated functions (tracking, visual inertial odometry functions, scene capture, ranging, three-dimensional image capture for facial recognition and environment mapping, etc.) or two or more of these operations may be performed by a shared camera.

Still referring to FIG. 3, the right-hand side of device 10 may also contain a second camera 52 and a third camera 54. Camera 52 may be a forward-facing (front-facing) camera having a wider field of view than pass-through camera 50. For instance, pass-through camera 50 may have a first field of view defined by an angle A1 in the YZ plane, whereas camera 52 may have a second field of view defined by an angle A2 in the YZ plane that is greater than angle A1. Camera 54 may be a downward-facing camera also have a relatively wide field of view. For instance, camera 54 may have a third field of view defined by an angle A3 in the YZ plane that is also greater than angle A1. The left-hand side of device 10 may have corresponding cameras 52 and 54 that are oriented in the same way. The angles of view of cameras 52 on the left and right sides may be configured to overlap in front of device 10, so that there are no gaps in coverage in front of the user. The angles of view of cameras 54 on the left and right sides may be configured to overlap below device 10, so that there are no gaps in coverage below device 10 where the user's hand and torso might be located when operating device 10. If desired, cameras 52 and 54 on the left and right sides of device 10 may be replaced by a single camera or any number of cameras.

Cameras 52 and 54 can be used in tracking the positions and movements of external objects (e.g., to track a user's hand, torso, or other body part, or to track external accessories) and can therefore sometimes be referred to as external object tracking cameras or object tracking sensors.

Cameras 52 and 54 can be used in conjunction with additional inertial measurement units (e.g., accelerometers, gyroscopes, gyrocompasses, magnetometers, etc.) as part of a visual inertial odometry (VIO) system for determining the position, movement, and/or orientation of device 10 relative to the surrounding environment and can therefore sometimes be referred to as orientation tracking cameras, orientation sensors, or motion sensors.

Figure 4:
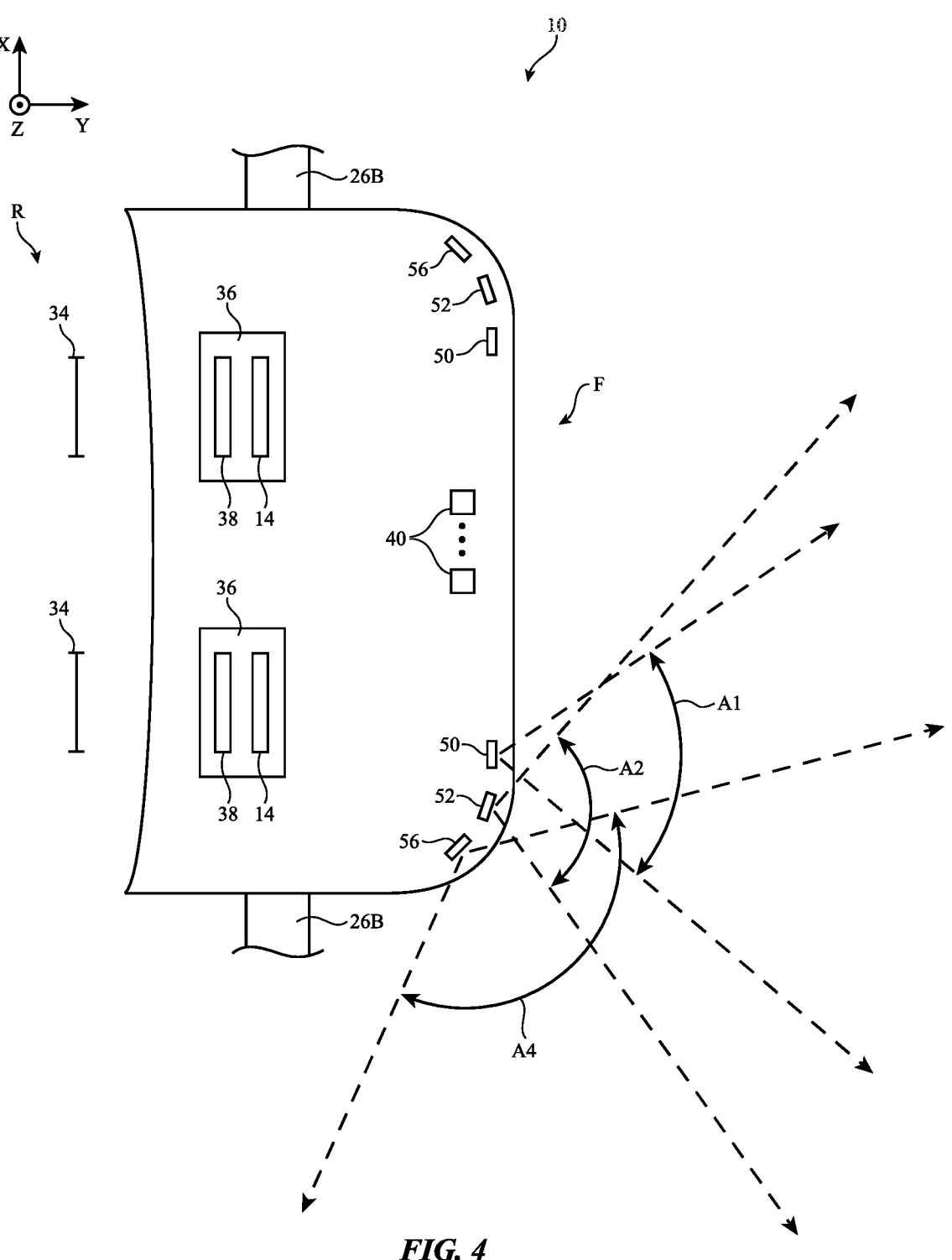
FIG. 4 is a top view of an illustrative electronic device with multiple cameras having different fields of view in accordance with some embodiments.

FIG. 4 is a top view of illustrative electronic device 10 showing left and right sides of the device. As shown FIG. 4, the right-hand side of device 10 may contain a pass-through (scene) camera 50, whereas the left-hand side of device 10 may contain another pass-through (scene) camera 50. Both pass-through cameras 50 on the left and right sides of device 10 are front-facing cameras having the same or similar orientations. The angles of view of cameras 50 on the left and right sides (see, e.g., field of view marked by angle A1) may be configured to overlap in front of device 10, so that there are no gaps in coverage in front of the user. If desired, cameras 50 on the left and right sides of device 10 may be replaced by a single camera or any number of outward-facing cameras.

The right-hand side of device 10 may include an object/orientation tracking camera 52, whereas the left-hand side of device 10 may include another object/orientation tracking camera 52. Both tracking cameras 52 on the left and right sides of device 10 are front-facing cameras having the same or similar orientations. The angles of view of cameras 52 on the left and right sides (see, e.g., field of view marked by angle A2) may be configured to overlap in front of device 10, so that there are no gaps in coverage in front of the user. If desired, cameras 52 on the left and right sides of device 10 may be replaced by a single camera or any number of outward-facing cameras.

In additional to cameras 50, 52, and 54 (not shown in FIG. 4 to avoid complicating the drawing), device 10 may also include sideways-facing cameras 56. Sideways-facing cameras 56 can be used in tracking the positions and movements of external objects (e.g., to track a user's hand, torso, or other body part, or to track external accessories) and can therefore sometimes be referred to as external object tracking cameras or object tracking sensors. Sideways-facing cameras 56 can also be used in conjunction with additional inertial measurement units (e.g., accelerometers, gyroscopes, etc.) as part of a visual inertial odometry (VIO) system for determining the position, movement, and/or orientation of device 10 relative to the surrounding environment and can therefore sometimes be referred to as orientation tracking cameras or orientation sensors.

As shown in FIG. 4, the right-hand side of device 10 may include an object/orientation tracking camera 56, whereas the left-hand side of device 10 may include another object/orientation tracking camera 56. Both tracking cameras 56 on the left and right sides of device 10 are sideways-facing cameras pointing towards the right-hand and left-hand sides of device 10, respectively. Sideways-facing cameras 56 may have a relatively wide field of view. For instance, each of cameras 56 may have a field of view defined by an angle A4 in the XY plane that is greater than the field of view angle A1 associated with pass-through camera 50.

As described above, cameras such as cameras 50 can be used to provide a real-time pass-through video to a user of a head-mounted device. A pass-through camera of a head-mounted device can be provided with an automatic exposure capability that automatically adjusts the exposure settings of the pass-through camera itself depending on whether a currently captured image is underexposed or overexposed.

Since a head-mounted device is mounted on a user's head, it is possible for the lighting conditions captured by the pass-through camera to change quickly as the user turns his/her head, especially in a high dynamic range environment where lighting levels vary greatly from one part of the environment to another.

Consider a scenario in which the user is initially facing a dimly lit desk and then turns to face a bright sunlit window. Upon detecting the much brighter illumination level of the sunlit window, the exposure settings of the pass-through camera can be automatically adjusted to compensate for the change in brightness. There can, however, be some time lag (delay) between when the user turns his/her head and when the camera automatic exposure adjustments occur. Such time lag can result in visual discomfort for the user.

In accordance with an embodiment, electronic device 10 can be provided with circuitry for acquiring (gathering) information about lighting characteristics of the environment in which device 10 is operated, for predicting where device 10 will be facing, and for adjusting one or more image settings associated with the pass-through camera based on the gathered lighting characteristics information of the environment and where the device will be facing. Operated in this way, camera settings can be adjusted instantaneously without noticeable delay as the user looks around different areas of the environment with different lighting characteristics (e.g., when the user looks at different portions of the environment with different illumination levels, different types of light sources, different color temperatures, different dynamic range, etc.).

Figure 5:
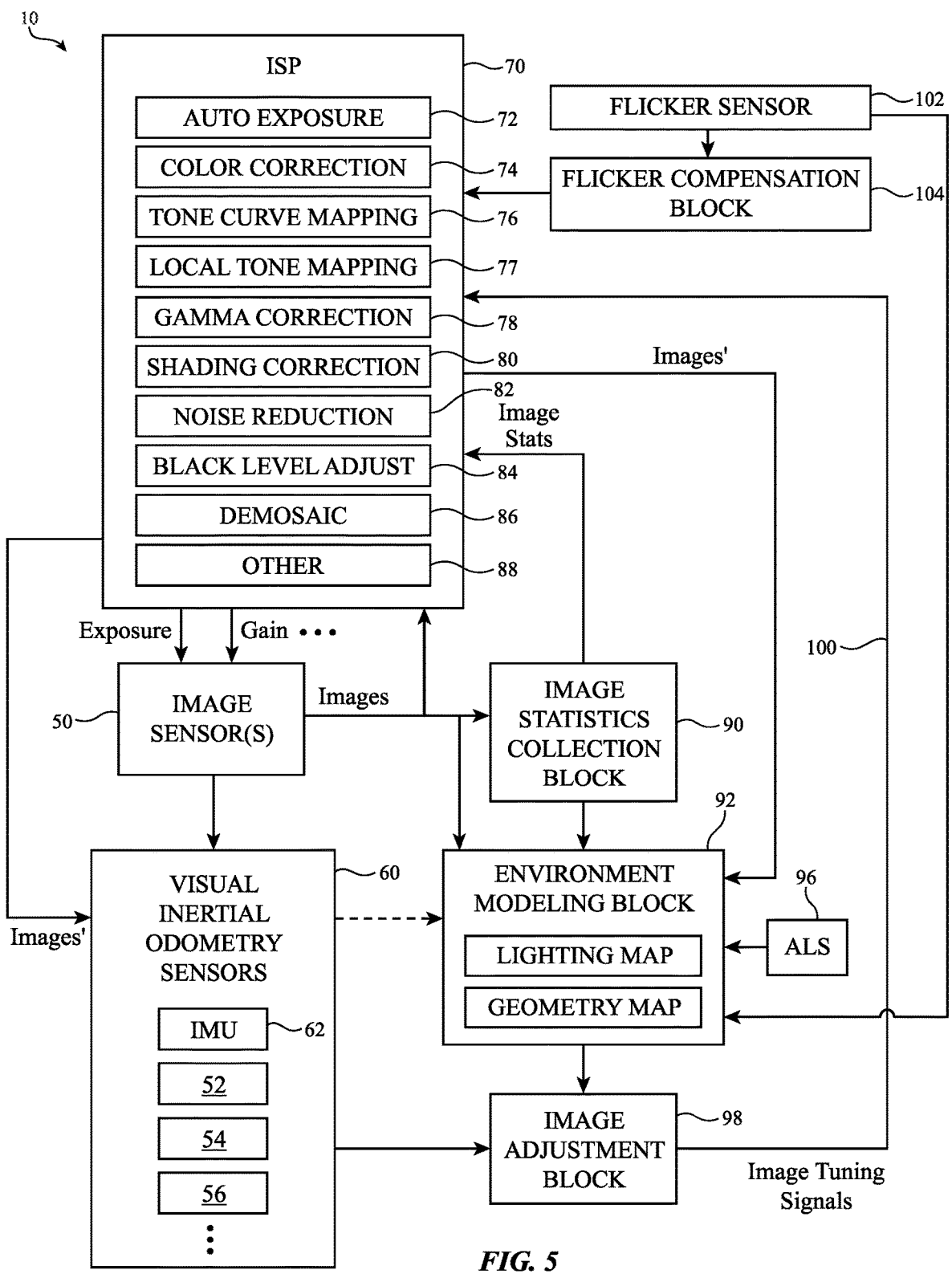
FIG. 5 is a block diagram of an illustrative electronic device having a future frame prediction system configured to produce image tuning signals based on a persistent lighting model in accordance with some embodiments.

FIG. 5 is a block diagram showing different hardware and/or software components within device 10 for adjusting one or more image settings for pass-through camera 50. Block 50 may represent one or more pass-through cameras that are implemented as color image sensors. The color image sensors may include an array of image pixels with an overlapping color filter array (as an example). Color image sensor(s) 50 may be charge-coupled device (CCD) image sensors, complementary metal-oxide-semiconductor (CMOS) image sensors, or other types of digital image sensors. If desired, pass-through camera 50 can be monochrome image sensors for capturing images without any color information.

In embodiments where pass-through camera 50 is a color image sensor, camera 50 may generate a raw color image that can be analyzed using an image statistics collection block such as image statistics analyzer 90. Image statistics analyzer 90 may receive captured images from camera 50 and analyze the captured images to obtain information relating to automatic exposure (AE) settings, auto focus (AF) settings, auto white balance (AWB) settings, brightness settings, black level compensation settings, an image histogram (e.g., a graphical representation of tonal distribution in a digital image), sharpness maps, flicker detection, object detection, spatial (depth) statistics, thumbnail information, lighting of the environment, image configuration, and/or other statistical information relating to the captured image. The information collected by image statistics analyzer 90 may be referred to collectively as image statistics information.

The captured images output from pass-through camera(s) 50 and the image statistics information output from image statistics analyzer 90 can be used to construct one or more models (maps) of the real-world environment in which device 10 is operated (sometimes referred to as a local environment). In the example of FIG. 5, device 10 may include an environment modeling block such as environment modeler 92 configured to create a persistent model of physical objects within the environment. Environment modeler 92 may gather distance, depth, and location (or generally spatial) information from various sensors in device 10 (e.g., using information from cameras 50, 52, 54, 56, flicker information from a flicker sensor 102, and/or other sensing components within sensor block 16 in FIG. 2) to construct a 3-dimensional map of the physical objects within the environment. This process, sometimes referred to as an environment (room) reconstruction operation during a physical environment modeling or information gathering phase, can occur over time as the user points device 10 at different parts of the environment to gather a more comprehensive dataset for the environment. The physical model of the environment, which can evolve over time as more physical information about the environment is being gathered, is sometimes referred to as a physical map of the real-world environment. The physical map of the real-world environment includes information about where physical objects are located and the shape of each physical object within the real-world environment surrounding device 10. This physical map of the 3D environment is sometimes referred to and defined as a geometric or geometry map. Obtaining a 3D map of the environment geometry in this way is optional.

Environment modeler 92 can also be configured to create a persistent model of the lighting within the real-world environment. Environment modeler 92 may gather color, intensity, reflectance, and/or generally lighting information from various sensors in device 10 (e.g., using color image information from cameras 50 and optionally cameras 52, 54, 56, and/or other sensing components within sensor block 16 in FIG. 2) to construct a 3-dimensional map of the lighting characteristics within the environment. This process, sometimes referred to as a light modeling or estimation operation during a light modeling or information gathering phase, can occur over time as the user points device 10 at different parts of the environment to gather more comprehensive lighting information from the environment.

The lighting model of the environment, which can evolve over time as more lighting information about the environment is being gathered, is sometimes referred to as a lighting map of the real-world environment. The lighting map can be defined as a dataset or data structure that includes information about the location of one or more light sources within the environment, an amount of light emitted from different portions of the environment, the type of light emitted from different portions of the environment, the number of light sources emitted from different portions of the environment, spectral BRDF (bidirectional reflectance distribution function) of one or more surfaces in the environment, and/or other lighting characteristics from different portions of the environment and is therefore sometimes referred to as spatially aware lighting information. The geometry map can optionally be merged with the lighting map to provide a more complete representation of the 3D environment.

If desired, separate lighting maps can be maintained as part of a lighting map database for different rooms in a house. For example, environment modeler 92 can create and/or maintain a first lighting map for an office within a house, a second lighting map for a bedroom within the house, and a third lighting map for a kitchen within the house. If desired, lighting maps can be maintained as part of a lighting map database for a room corresponding to different time slots throughout a day. For example, environment modeler 92 can create and/or maintain a first lighting map for an office corresponding to a morning time slot, a second lighting map for the same office corresponding to an afternoon time slot, and a third lighting map for the office corresponding to a nighttime slot. Environment modeler 92 operated in this way to create and maintain a lighting map of the environment can be referred to as a light mapping circuit, light modeling circuit, or light estimation circuit.

Environment modeler 92 can optionally build the lighting model using measurements from additional light sensors such as measurements from an ambient light sensor 96 within device 10. Ambient light sensor 96 can have a wider dynamic range and better spectral resolution than the color image sensor of scene camera 50 and can therefore be used to more effectively capture the absolute light level and color information from the real-world environment. Since ambient light sensor 96 has a larger dynamic range and enhanced spectral resolution than camera 50, ambient light sensor 96 can provide additional useful information for modeling the environment even when measurements from cameras, 50, 52, 54, or 56 saturates.

Device 10 can include visual inertial odometry (VIO) sensors 60 for gathering information used to track an orientation and position of device 10 when worn on a user's head. Visual inertial odometry sensors 60 can include inertial measurement units 62 (e.g., gyroscopes, gyrocompasses, accelerometers, magnetometers, and/or other inertial sensors), tracking cameras such as cameras 52, 54, and 56, and other position and motion sensors. These position and motion sensors may assume that head-mounted device 10 is mounted on the user's head. Therefore, herein, references to head pose, head movement, yaw of the user's head (e.g., rotation around the vertical axis), pitch of the user's head (e.g., rotation around the side-to-side axis), roll of the user's head (e.g., rotation around the front-to-back axis), etc. may be considered interchangeable with references to references to device pose, device movement, yaw of the device, pitch of the device, roll of the device, etc. In certain embodiments, device 10 may also include 6 DoF tracking systems. Six DoF tracking systems or sensors can be used to monitor both rotational movement such as roll, pitch, and yaw and also positional movement in the X, Y and Z axis in a 3D environment.

Sensors 60 may directly determine pose, movement, yaw, pitch, roll, etc. for head-mounted device 10. The yaw, roll, and pitch of the user's head may collectively define the user's head pose. These components for tracking the orientation and/or position of the user's head relative to the surrounding environment can therefore sometimes be referred to collectively as a head tracker, head pose tracker, a head (pose) tracking system, a head (pose) tracking sensor, orientation sensors, position sensors, etc. Detected changes in head pose may be used as user input to head-mounted device 10. Sensors 60 can therefore be used to determine where head-mounted device 10 is currently facing in the real-world environment (e.g., to determine where pass-through camera 50 is currently pointing). This head pose information, along with the images captured using camera(s) 50, can be fed to environment modeler 92 when creating the lighting model (map) of the environment.

Sensors 60 can thus be used to determine a current orientation and position of device 10 within the environment. Information about the current orientation and position of device 10 along with information about the past (historical) orientation and position of device 10 can be used to determine (predict) a future orientation and position of device 10 within the environment. Sensors 60 can thus be used to determine where the main pass-through camera 50 will be facing or pointing at when capturing a future frame (e.g., to predict where the user will be looking in about 10 milliseconds, 20 milliseconds, 30 milliseconds, 10-100 milliseconds, etc.). In other words, sensors 60 can be used to determine, predict, or estimate a future head pose or future device orientation.

This prediction information (pre-knowledge) of where device 10 will be facing before device 10 reaches that pose and the pre-mapped lighting model of the real-world environment can be combined at an image adjustment block such as image adjuster (controller) 98 to produce image tuning signals that adjust how pass-through camera 50 captures images and thus how the captured images are displayed to the user.

Consider, for example, the scenario in which the user having device 10 mounted on his/her head is initially facing a dimly lit desk and then turns to face a bright sunlit window. In this scenario, sensors 60 can be used to predict that pass-through camera 50 will be pointing at the bright sunlit window even before the bright sunlit window enters the field of view of camera 50 or just as an edge of the bright sunlit window enters the field of view of camera 50. Image adjustment block 98 can leverage this prediction information and look up the lighting map created by block 92 to determine lighting characteristics of the region of the environment that will be coming into the field of view of camera 50. Since the lighting map should already be aware of the high illumination levels of the window, image adjustment block can proactively or preemptively adjust one or more settings associated with camera 50 to ensure that the image captured by camera 50 is properly exposed when the user is actually facing the brightly lit window.

Image adjustment block 98 may output control signals to an image signal processor (ISP) 70 within device 10 to adjust one or more imaging settings for pass-through camera 50 based on the future head pose information and the persistent lighting map of the environment. Image signal processor 70, which is sometimes considered to be part of one of the processors in circuitry 12 (FIG. 2), is an image processing unit used for processing the raw digital images output from the one or more cameras such as camera(s) 50 on device 10. Image signal processor 70 can be used to perform a series of post-processing operations on the image captured by camera 50 prior to displaying the images to the user of device 10. Image signal processor 70 may process the raw images to produce corresponding processed images (see Image' in FIG. 5), which can be fed to visual inertial odometry sensors 60 and/or other sensors within device 10 and to environment modeling block 92 to help build a lighting map, a geometry map, and/or other model(s) of the 3-dimensional environment.

As shown in FIG. 5, image signal processor 70 may include an automatic exposure (AE) block 72 for controlling an exposure setting for pass-through camera 50, an automatic color correction block 74 (sometimes referred to as an automatic white balance block) for controlling a white balance setting for camera 50, a tone curve mapping block 76 for globally controlling a tone curve setting for camera 50, a local tone mapping block 77 for locally controlling the tone setting for one or more portions of the image, a gamma correction block 78 for controlling a gamma curve setting for camera 50, a shading correction block 80 for controlling how camera 50 corrects for regional brightness variations in an image, a noise reduction block 82 for controlling how camera 50 reduces noise in an image, a black level adjustment block 84 for controlling a black level setting for camera 50, a demosaicing block 86 for controlling how camera 50 reconstructs a full color image from a Bayer color pattern (as an example), and/or other image processing blocks 88, which can include an image sharpening block, a high dynamic range (HDR) correction block, a facial recognition block for detecting faces in a scene, an automatic scene recognition block for recognizing different types of scenery, a lens correction block for correcting lens shading issues, lens vignetting, and lens distortion, a color space conversion block for converting an RGB signal to other color spaces (if desired), just to name a few.

In the example above, image adjuster 98 can send control signals to automatic exposure (AE) block 72 to immediately or subsequently lower the automatic exposure settings of camera 50 upon detecting that the user is turning to face or will soon be facing the bright sunlit window. For instance, the AE block 72 can adjust an exposure time setting and/or a gain setting for camera 50 to adjust the camera's overall exposure level. To increase the overall exposure level, the AE block 72 can increase the exposure time (e.g., by reducing the shutter or curtain speed of camera 50) and/or increase the gain setting (e.g., by increasing the sensitivity of camera 50). To decrease the overall exposure level, the AE block 72 can decrease the exposure time (e.g., by increasing the shutter or curtain speed of camera 50) and/or to decrease the gain setting (e.g., by decreasing the sensitivity of camera 50). Proactively adjusting the camera's automatic exposure settings in this way can help reduce the delay that would otherwise be noticeable to the user if device 10 relies solely on the presently captured image to determine the automatic exposure settings for camera 50. Adjustments in the automatic exposure settings can be gradual or ramped to minimize user discomfort or to otherwise help provide a seamless transition for the user. If the user then turns back to face the dimly lit desk, image adjuster 98 can proactively increase the automatic exposure settings of camera 50 upon detecting that the user is turning to face or will soon be facing the darker desk, assuming the lighting level of the darker desk has already been modeled by the lighting map of the environment.

The example above in which image adjustment block 98 automatically tunes the automatic exposure setting of pass-through camera 50 based on the predicted head pose information and based on the lighting map information is illustrative and not intended to limit the scope of the present embodiments. As another example, image adjustment block 98 can also be used to proactively tune the color correction block 74 based on the predicted head pose information and based on the predetermined lighting map information. For instance, when a user of device 10 turns from facing a first area of the environment that is lit with an incandescent light source to facing a second area of the environment that is lit by daylight, image adjustment block 98 can proactively tune color correction block 74 to adjust the automatic white balance from a first white balance setting suitable for a scene that is lit with an incandescent light source (e.g., a much warmer light source) to a second white balance setting suitable for a scene that is lit by daylight (e.g., a much cooler light source). As another example, image adjustment block 98 can also be used to proactively tune the tone curve mapping block 76 and/or the local tone mapping block 77 based on the predicted head pose information and based on the persistent lighting map information. In general, image adjuster 98 can be used to proactively adjust any block within the image signal processor 70 upon detecting a change in the orientation of device 10 and detecting that camera 50 will be pointing at a portion of the environment having different lighting characteristics. If desired, image adjustment block 98 can be used to proactively adjust any block within image signal processor 70 or to adjust one or more settings for camera 50 using the lighting map information of the environment, the physical map information of the environment, and/or the head pose and orientation information.

The examples above in which image adjustment block 98 varies the camera settings as device 10 faces different parts of an environment (room) is illustrative. The changes to the various camera settings can be gradual or ramped to minimize user discomfort or to otherwise help provide a seamless transition for the user.

The embodiments above in which the image settings are tuned using a lighting map built from historical modeling information is illustrative and is not intended to limit the scope of the present embodiments. In another suitable approach, the image settings of the main pass-through camera can be used based on a prediction of where the user will be facing and based on images gathered in real time or recently acquired images from the secondary cameras (e.g., cameras 52, 54, 56, and/or other cameras having a wider field of view compared to the main pass-through camera). Since the secondary cameras have a wider field of view than the main pass-through camera, images captured by the secondary cameras can include information about the lighting that will be coming into the field of view of the main pass-through camera as the user looks around the environment.

In some embodiments, the main pass-through camera(s) 50 and the other supplemental cameras (e.g., cameras 52, 54, and 56 and/or other tracking or motion sensing cameras) on device 10 can all be implemented as color image sensors. In other embodiments, the main pass-through camera(s) 50 can be implemented as color image sensors while the other supplemental cameras on device 10 can be implemented as monochrome image sensors. In yet other embodiments, the main pass-through camera(s) 50 and the other supplemental cameras (e.g., cameras 52, 54, and 56 and/or other tracking or motion sensing cameras) on device 10 can all be implemented as monochrome image sensors. In yet other embodiments, the main pass-through camera(s) 50 can be implemented as monochrome image sensors while the other supplemental cameras on device 10 can be implemented as color image sensors.

The embodiments above in which the settings for one or more cameras within device 10 is dynamically adjusted based on the user's current head pose is illustrative. In another suitable approach, image adjustment block 98 can be used to provide a single imaging setting for an entire room. For example, image adjustment block 98 can be used to identify a single (only one) automatic exposure setting for the entire room based on the lighting map information for that room. Consider the scenario where a first part of a room is dimly lit and where a second part of the room is brightly lit. In this scenario, image adjuster 98 can program camera 50 to use a single intermediate exposure setting regardless of where camera 50 is currently pointing in the room. Operated in this way, the exposure setting will not change even as the user points camera 50 at different parts of the room with varying illumination levels. As another example, block 98 can be used to determine a single automatic white balance setting for an entire room based on the lighting map information. As another example, block 98 can be used to determine a single tone curve mapping setting for an entire room based on the lighting map information. As another example, block 98 can be used to determine a single gamma curve mapping setting for an entire room based on the lighting map information. In general, image adjuster 98 can be used to determine a single setting for any block within image signal processor 70 regardless of where camera 50 is pointing in the room.

One or more settings for pass-through camera 50 can also be adjusted based on information from a flicker sensor. As shown in FIG. 5, head-mounted device 10 can also include a flicker detection sensor such as flicker sensor 102. Flicker sensor 102 can detect one or more sources of flicker and can also detect the frequency of each detected flicker source (e.g., to detect a flicker period that is equal to the inverse of the flicker frequency). Flicker sensor 102 may be coupled to a flicker compensation block such as flicker compensator 104. Upon detection of one or more sources of flicker by flicker sensor 102, flicker compensator 104 is activated to mitigate flicker artifacts that can show up in the images captured by pass-through camera 50. For example, flicker compensator 104 can adjust the exposure time of camera 50 so that the exposure time is a multiple of the detected flicker period.

If multiple flicker light sources are present, flicker compensator 104 can be configured to compensate the strongest flicker source (e.g., flicker compensator 104 can adjust the exposure time of camera 50 so that the exposure is a multiple of the detected flicker period corresponding to the highest intensity flicker source). If desired, flicker compensator 104 can be activated based on the lighting map information and/or the physical map information of the environment. The lighting map information may include spatially aware data indicating areas of the environment having one or more sources of flicker. Thus, flicker compensator 104 can be selectively activated when the head pose information indicates that the user of device 10 is facing an area of the environment that includes one or more sources of flicker.

The various blocks shown in FIG. 5 such as blocks 90, 92, 90, and 104 can be considered as part of control circuitry 12 (see FIG. 2) and/or part of one or more processors on device 10. The operations of these blocks can be performed using hardware (e.g., dedicated hardware or circuitry), firmware, and/or software. Software code for performing these operations may be stored on non-transitory computer readable storage media (e.g., tangible computer readable storage media) stored on one or more of the components of device 10 (e.g., within storage circuitry 12 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in control circuitry 12 of FIG. 2). The processing circuitry may include microprocessors, application processors, digital signal processors, central processing units (CPUs), application-specific integrated circuits with processing circuitry, or other processing circuitry.

FIG. 6 is a flow chart of illustrative steps for operating a head-mounted electronic device 10 of the type shown in FIG. 5. During the operations of block 110, an environment modeler (e.g., environment modeling block 92 of FIG. 5) can optionally obtain information about the physical objects within the environment (sometimes referred to as a persistent map/model of physical objects within an environment or physical map information). The environment modeler may gather distance, depth, location, or other spatial information from various sensors in device 10 (e.g., using information from cameras 50, 52, 54, 56, and/or other sensing components within sensor block 16 in FIG. 2) to construct a 3-dimensional spatially aware map of the physical objects within the environment.

During the operations of block 112, the environment modeler may optionally obtain information about the lighting characteristics of the environment (sometimes referred to as a persistent map/model of the lighting in an environment or lighting map information). The environment modeler may gather color, intensity, reflectance, or other lighting information from various sensors in device 10 (e.g., using image information from cameras 50 and optionally cameras 52, 54, 56, and/or other sensing components within sensor block 16 in FIG. 2) to construct a 3-dimensional (spatial) map of lighting information within the environment.

The operations of blocks 110 and 112, sometimes referred to as physical modeling and light modeling operations, respectively, can occur during an initial information gathering phase or can occur over time as the user points device 10 at different parts of the environment to gather a more comprehensive historical dataset characterizing the environment. If desired, the environment modeler can optionally build the physical/lighting model using measurements from additional light sensors such as measurements from an ambient light sensor (e.g., ambient light sensor 96), a flicker sensor (e.g., flicker sensor 102), and/or other types of sensors within device 10.

During the operations of block 114, one or more sensors with device 10 may be used to predict where device 10 will be facing in a future frame. For example, device 10 may gather information from pass-through camera 50, tracking cameras 52, 54, and 56, gyroscopes, gyrocompasses, accelerometers, magnetometers, and other inertial measurement units, and/or other visual inertial odometry system sensors (e.g., visual inertial odometry sensors 60) within head-mounted device 10 to determine where the pass-through camera might be pointing within the next 10-50 milliseconds. This prediction can be based on the present (current) head pose information and past (historical) head pose information of device 10. The predicted (future) head pose information can, for example, be obtained by extrapolating from the historical and current head pose information.

During the operations of block 116, one or more settings of pass-through camera 50 can be dynamically adjusted based on the prediction information gathered during the operations of block 114 and based on the lighting map information gathered during the operations of block 112 (and optionally based on information about the physical location of the objects within the environment gathered during the operations of block 110). As an example, an exposure setting of the pass-through camera can be automatically adjusted in response to determining that the user will be turning from facing a darker portion of the environment to facing a brighter portion of the environment (e.g., by adjusting an exposure time setting and/or by adjusting a camera gain/sensitivity setting). As another example, a white balance setting of the pass-through camera can be automatically adjusted in response to determining that the user will be turning from facing a portion of the environment dominated by a light source of a first color temperature to facing another portion of the environment dominated by a light source of a second color temperature different than the first color temperature. In general, any image processing block within the image signal processor 70 can be automatically adjusted based on the head pose prediction and the lighting map information.

During the operations of block 118, one or more image sensors on device 10 can optionally be adjusted based on measurements from a flicker sensor (e.g., flicker sensor 102). For example, upon detecting that flicker might be an issue, an exposure time of the pass-through camera can be adjusted to a multiple of the detected flicker period to prevent flicker from being captured. This flicker compensation operation might only be activated when the user is actually viewing a portion of the environment having one or more sources of flicker. As another example, consider a scenario in which a user turns from facing a portion of the scene without any flicker to then facing another portion of the scene with some detectable flicker. In such scenario, the lighting map can predict that the user will be seeing some flicker and can thus direct image adjustment block to pro-actively or preemptively perform some flicker compensation operation to reduce the flicker seen by the user. If desired, the exposure settings of the pass-through camera can be locked to a multiple of the flicker period if it is determined that a room has at least one source of flicker such that no flicker will be captured regardless of where the user is facing in that room. If desired, settings associated with the other supplemental cameras (e.g., cameras 52, 54, 56, and other tracking or motion sensors) can be adjusted based on measurements from the flicker sensor.

Figure 7:
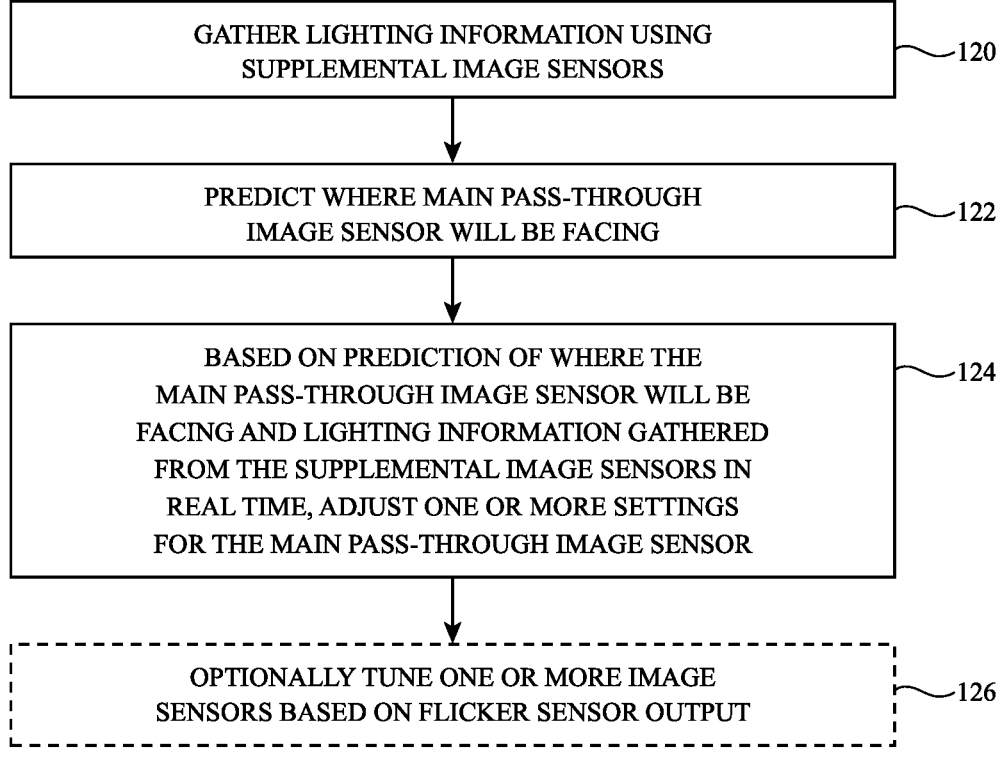
FIG. 7 is a flow chart of illustrative steps for operating an electronic device using real-time image adjustments based on information gathered from supplemental image sensors in accordance with some embodiments.

The operations of FIG. 6 that perform image adjustments based on a lighting map constructed from historical lighting data are illustrative and are not intended to limit the scope of the present embodiments. FIG. 7 illustrates another example in which adjustments to the main pass-through camera are based on a prediction of where the user will be facing and based on live information being gathered from one or more supplemental cameras. During the operations of block 120, supplemental image sensors (e.g., cameras 52, 54, 56 and other tracking or motion sensors) can be used to gather lighting information from the real-world environment. The supplemental image sensors can have a wider field of view than the main pass-through camera (see, e.g., FIGS. 3 and 4). Because the supplemental image sensors have a wider field of view, they can be used to capture additional lighting information that cannot otherwise be captured by the main pass-through camera in the current frame. As an example, a bright sunlit window may enter the field of view of one of the supplemental image sensors before that sunlit window enters the field of view of the main pass-through camera. The additional lighting information can also be gathered using one or more flicker sensor, one or more ambient light sensor, and/or other optical sensor in device 10.

During the operations of block 122, one or more sensors with device 10 may be used to predict where device 10 will be facing in a future frame. For example, device 10 may gather information from pass-through camera 50, tracking cameras 52, 54, and 56, gyroscopes, gyrocompasses, accelerometers, magnetometers, and other inertial measurement units, and/or other visual inertial odometry system sensors (e.g., visual inertial odometry sensors 60) within head-mounted device 10 to determine where the pass-through camera might be pointing within the next 10-50 milliseconds. This prediction can be based on the present (current) head pose information and past (historical) head pose information of device 10. The predicted (future) head pose information can, for example, be obtained by extrapolating from the historical and current head pose information.

The example of FIG. 7 in which block 120 precedes block 122 is merely illustrative. In general, the operations of blocks 120 and 122 can be performed concurrently (in parallel) to gather live information which can be used to dynamically adjust one or more settings of the main pass-through camera. The operations of block 122 can also precede the operations of block 120.

During the operations of block 124, one or more settings of pass-through camera 50 can be dynamically adjusted based on the prediction information gathered during the operations of block 122 and based on the lighting information gathered from the supplemental image sensors during the operations of block 120. As an example, an exposure setting of the pass-through camera can be automatically adjusted in response to determining that the user will be turning from facing a darker portion of the environment to facing a brighter portion of the environment as anticipated from the wider field of view of at least one of the supplemental image sensors (e.g., by adjusting an exposure time setting and/or by adjusting a camera gain/sensitivity setting). As another example, a white balance setting of the pass-through camera can be automatically adjusted in response to determining that the user will be turning from facing a portion of the environment dominated by a light source of a first color temperature to facing another portion of the environment dominated by a light source of a second color temperature different than the first color temperature as anticipated from the wider field of view of at least one of the supplemental image sensors. In general, any image processing block within the image signal processor 70 can be automatically adjusted based on the head pose prediction and lighting information captured from one or more of the supplemental image sensors.

During the operations of block 126, one or more image sensors on device 10 can optionally be adjusted based on measurements from a flicker sensor (e.g., flicker sensor 102). For example, upon detecting that flicker might be an issue, an exposure time of the pass-through camera can be adjusted to a multiple of the detected flicker period to prevent flicker from being captured. This flicker compensation operation might only be activated when the user is actually viewing a portion of the environment having one or more sources of flicker. If desired, the exposure settings of the pass-through camera can be locked to a multiple of the flicker period if it is determined that a room has at least one source of flicker such that no flicker will be captured regardless of where the user is facing in that room. If desired, settings associated with the other supplemental cameras (e.g., cameras 52, 54, 56, and other tracking or motion sensors) can be adjusted based on measurements from the flicker sensor.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

The foregoing is merely illustrative and various modifications can be made to the described embodiments. The foregoing embodiments may be implemented individually or in any combination.

What is claimed is:

1. A method of operating a head-mounted device in a real-world environment, comprising:

capturing first images of the real-world environment using a first image sensor;

capturing second live images of the real-world environment using a second image sensor;

predicting a direction in which the head-mounted device will be facing in the real-world environment; and adjusting one or more settings of the first image sensor based on the second live images and the predicted direction of the head-mounted device in the real-world environment.

2. The method of claim 1, further comprising:

displaying the first images captured using the first image sensor to an eye box.

3. The method of claim 2, wherein the first image sensor has a first field of view and the second image sensor has a second field of view wider than the first field of view.

4. The method of claim 2, wherein capturing the first images comprises capturing color images using the first image sensor.

5. The method of claim 4, wherein capturing the second images of the real-world environment using the second image sensor comprises capturing monochrome images of the real-world environment using the second image sensor.

6. The method of claim 1, wherein the first image sensor is front-facing and the second image sensor is sideways-facing or downward-facing.

7. The method of claim 1, wherein predicting a direction in which the head-mounted device will be facing in the real-world environment comprises using one or more motion sensors to determine head pose information associated with the head-mounted device.

8. The method of claim 1, wherein adjusting the one or more settings of the first image sensor comprises adjusting an exposure of the first image sensor based on the second live images and the predicted direction of the head-mounted device in the real-world environment.

9. The method of claim 8, wherein adjusting the exposure of the first image sensor comprises adjusting an exposure duration of the first image sensor or adjusting a gain of the first image sensor.

10. The method of claim 1, wherein adjusting the one or more settings of the first image sensor comprises adjusting a white balance and adjusting a global or local tone mapping for images captured by the first image sensor based on the second live images and the predicted direction of the head-mounted device in the real-world environment.

11. The method of claim 1, further comprising:

obtaining a first flicker sensor measurement and a first intensity measurement for a first light source located within the real-world environment;

obtaining a second flicker sensor measurement and a second intensity measurement for a second light source located within the real-world environment;

determining a higher intensity measurement of the first and second intensity measurements; and adjusting an exposure time of the first image sensor based on the flicker sensor measurement associated with the higher intensity measurement.

12. The method of claim 1, further comprising:

obtaining a flicker sensor measurement indicating a flicker period of a light source located within the real-world environment; and adjusting an exposure time of the first image sensor to a multiple of the flicker period.

13. The method of claim 1, further comprising:

obtaining a flicker sensor measurement; and adjusting an exposure time of the first image sensor based on the flicker sensor measurement.

14. A head-mounted device operable in a real-world environment containing lighting from one or more light sources, comprising:

a first sensor configured to capture a first image of the real-world environment, wherein the first sensor has a first field of view;

a display configured to present the first image;

a second sensor configured to capture a second image of the lighting within the real-world environment, wherein the second sensor has a second field of view wider than the first field of view;

a third sensor configured to output motion data that is used to predict a direction in which the first sensor will be pointing within the real-world environment; and control circuitry configured to adjust a setting for the first sensor based on real-time information from the second image captured by the second sensor and the predicted direction of the first sensor within the real-world environment.

15. The head-mounted device of claim 14, wherein the second sensor comprises a tracking camera.

16. The head-mounted device of claim 14, wherein the first sensor comprises a front-facing camera and the second sensor comprises a sideways-facing camera.

17. The head-mounted device of claim 14, wherein the first sensor comprises a color image sensor and wherein the second sensor comprises a monochrome image sensor.

18. The head-mounted device of claim 14, wherein the third sensor comprises an inertial measurement unit.

19. The head-mounted device of claim 14, further comprising:

an ambient light sensor configured to output an ambient light sensor measurement; and a flicker sensor configured to output a flicker sensor measurement, wherein the control circuitry is configured to create a lighting map indicating where the light sources are located within the real-world environment based on the second image, the ambient light sensor measurement, and the flicker sensor measurement.

* * * * *